United States Patent Office 2,834,811
Patented May 13, 1958

2,834,811

PREPARATION OF ACETYLACETONE

Karl K. Georgieff, Shawinigan Falls, Quebec, Canada, assignor to Shawinigan Chemicals Limited, Montreal, Quebec, Canada, a corporation of Canada No Drawing. Application November 27, 1956
Serial No. 624,492

5 Claims. (Cl. 260—593)

This invention relates to an improvement in the process for the preparation of acetylacetone by condensation of lower alkyl esters of acetic acid with acetone and in particular to a method for working up alkali metal salts of acetylacetone to recover acetylacetone therefrom.

It is well known that, by condensation of the type generally referred to as "Claisen condensations," it is possible to prepare alkali metal salts of acetylacetone. In such methods it has been usual to react acetate esters, for example methyl acetate or ethyl acetate, with acetone in the presence of basic acylation reagent catalysts. These catalysts are well known and are strongly basic materials containing alkali, for example, in the free state or in compound form. Examples of suitable catalysts are sodium alkoxide, sodium hydride suspensions, finely dispersed suspensions of metallic sodium and sodium amide (cf. "Organic Reactions", vol. VIII, by Adams et al.). Because of the strong basic nature of these catalysts, the desired condensation product is always found in an alkaline mixture in the form of a sodium salt.

In order to recover the acetylacetone, it is necessary to neutralize the salt and isolate the liberated acetylacetone from accompanying by-products, unreacted reactants, and any vehicles or diluents which may have been used, the neutralization being accomplished by adding to the mixture an excess of acid or at least an amount of acid equivalent to the amount of alkali initially added to catalyze the reaction. Without any exceptions this has always had deleterious effects on product purity, and the resulting acetylacetone is contaminated with acid.

The present invention involves a system of fractional acidification of a mixture containing the sodium salt of acetylacetone and the separation of the acetylacetone immediately after each acidification stage. Most of the acetylacetone prepared by this method is substantially free from acid contamination. In fact, with acetic acid as acidifier, the concentration of acetic acid in the acetylacetone is so low that it cannot be measured by infrared spectrometry, i. e., it is much less than 0.6% of the acetylacetone. The purity of this product compares quite favourably with that of acetylacetone purified by converting it to its copper salt and regenerating it with a non-volatile acid, for example $H_2SO_4$. It is also far superior to commercial acetylacetone prepared from ketene and acetone via isopropenyl acetate (2-acetoxy propene); this product usually contains between 3–5% acetic acid and 5–7% total impurities.

According to this invention, a reaction mixture containing a sodium salt of acetylacetone, prepared in accordance with any of the known reactions which are catalyzed by basic acylation reagents, is acidified with organic acid in successive stages to progressively decreasing pH values to liberate acetylacetone from its salt, and the liberated acetylacetone is recovered from the acidified reaction mixture after each of the successive acidification stages.

The organic acid used to acidify the salt of acetylacetone must of course be strong enough to liberate the acetylacetone. Obviously for economic reasons it is desirable to use the least expensive of these, and acetic acid and formic acid are excellent for the purpose. Carbonic acid may also be used, and this acid would have the particular advantage that it would not carry the acidification too far in any neutralization stage, since carbonic acid will not provide a low pH. Further, different acids may be used for different stages of acidification; for example an initial acidification may be made with carbonic acid and subsequent acidification with a stronger organic acid, for example acetic acid. Mineral (non-volatile) acids are not desirable for purposes of this invention, as they seem to decompose the materials or products in an undesired way and provide a lower yield of acetylacetone than can be obtained with the foregoing organic acids.

According to a preferred form of the invention, sodium salt of acetylacetone in crude reaction mixture, usually a slurry prepared by the condensation reaction between acetone and lower alkyl acetate ester in the presence of a catalyst comprising metallic sodium or other basic acylation reagent catalyst, is first cooled and mixed with sufficient water to dissolve the sodium salts. Several minutes of uninterrupted and vigorous agitation are required to effect this solution. The upper organic layer which separates contains unreacted alkyl acetate and any diluent used, for example toluene, xylene, isohexane or "Varsol" (petroleum hydrocarbon fraction); this layer is separated and rejected. The lower aqueous layer is then immediately acidified with sufficient acetic acid to reduce the pH level to a value between 6.5 and 7.0. This liberates most of the acetylacetone in a medium from which it can be recovered uncontaminated by acetic acid. A large portion of the acetylacetone thus liberated separates as a liquid layer which floats on top of the aqueous layer and is separated therefrom. The rest of the liberated acetylacetone remains dissolved in the aqueous layer and is separated therefrom by liquid-liquid extraction with water immiscible solvent for acetylacetone, for example ethyl acetate or isopropyl acetate. A second addition of acetic acid to the aqueous layer, lowering the pH by 0.3 to 0.7 unit of pH below the former level, but in no case below 6.0, liberates a small amount of acetylacetone which remains in solution in the aqueous layer and can be recovered therefrom by liquid-liquid extraction as above. This small amount of acetylacetone is also substantially free of acetic acid, but is usually so small that its recovery is uneconomic. Hence, a second addition of acetic acid to the aqueous layer which lowers the pH to 5.7±0.1, is usually preferred to liberate all the remainder of the acetylacetone from its salt. This acetylacetone, contaminated with acetic acid, can be recovered by liquid-liquid extraction as above. This acetylacetone containing acetic acid can then be recycled for addition to a subsequent batch of sodium salt of acetylacetone, whereby the acetic acid neutralizes sodium salt and the recycled acetylacetone is recovered with the acid-free product of this subsequent batch.

The following table gives the percentages of acetylacetone liberated from sodium salt by acetic acid at various pH values:

| pH | Percent Acetylacetone Liberated |
|---|---|
| 8.4 | 81.5 |
| 6.7 | 96–98 |
| 5.8 | 100 |

The percentages of acetylacetone liberated from the sodium salt by acetic acid at the foregoing pH values are not necessarily the percentages that will be liberated by other acids at the same pH values. The percentage liberated will depend primarily on the acid used at any specific pH, hence the specific pH value used for any acidification stage is chosen in accordance with the acid used and the proportion of the acetylacetone that it is desired to liberate in that stage.

The following example illustrates the invention:

Catalyst was prepared by heating finely divided sodium, (particle size 1 to 20 microns, average 10 microns), xylene, and 0.25% aluminum octoate, to 110-120° C. in a flask fitted with a high speed stirrer and gradually raising the speed of the stirrer to 15,000 R. P. M. To a nitrogen-flushed flask charged with 601 grams methyl acetate, 115.0 grams redistilled acetone, 5.0 grams of sodium salt of acetylacetone and 775 cc. of xylene at 18.5° C. was added with stirring 45.6 grams of sodium dispersed in 305 cc. xylene. The reaction mixture was kept at 17–20° C. by cooling until evolution of hydrogen ceased and was then refluxed for a period of 30 minutes at 74° C. The crude product was cooled and shaken with 900 cc. of water, then the aqueous layer was quickly separated and treated with 84.9 grams glacial acetic acid which reduced the pH to 6.7±0.1. Some of the liberated acetylacetone floated to the top and was separated. The aqueous layer was then extracted with three 150 cc. portions of ethyl acetate; the ethyl acetate was distilled off at atmospheric pressure and the acetylacetone residue was distilled under vacuum. The pH of the water layer was further reduced to 5.6 by adding 15.0 grams acetic acid; the water layer was then extracted with ethyl acetate, and acetylacetone recovered from the extract as before. The weight of acetylacetone liberated and recovered by the first acidification step was 131.6 grams, after deducting the equivalent of the 5.0 grams of sodium salt of acetylacetone included in the original charge. The proportion of acetic acid in this acetylacetone was too small to be detected by infra-red spectrometry, hence was less than 0.6%. The weight of acetylacetone liberated and recovered by the second acidification step was 6.4 grams. This material could not be recovered in such purity as the previous fraction, being contaminated with an undesirable proportion of acetic acid. However it could be utilized in the neutralization of a subsequent batch of sodium salt of acetylacetone, hence the acetylacetone could be completely recovered in a continuous series of batches.

It is understood that the present invention is not limited by the modifications and example herein disclosed and that any adaptation or modification apparent to a skilled chemist is intended to come within the scope and spirit of the invention.

What is claimed is:

1. A process for the preparation of acetylacetone from a reaction mixture containing the sodium salt of acetylacetone comprising (a) acidifying the reaction mixture with organic acid to decreasing pH values in successive stages to liberate only a part of the acetylacetone from its salt in each stage prior to the last stage and (b) recovering the liberated acetylacetone from the acidified reaction mixture after each of the successive acidification stages.

2. A process as claimed in claim 1 in which the pH values in successive stages are 6.7±0.1 and 5.7±0.1.

3. A process as claimed in claim 2 in which the organic acid is acetic acid.

4. A process for the preparation of acetylacetone substantially free from contamination by acetic acid comprising acidifying an aqueous solution containing sodium salt of acetylacetone with sufficient acetic acid to reduce the pH value of the mixture to between 6.5 to 7.0, separating and recovering acetylacetone which appears as a separate phase, extracting and recovering the additional liberated acetylacetone from the acidified aqueous solution with a water immiscible solvent for acetylacetone, repeating the addition of acetic acid to reduce the pH of the aqueous solution to a value not higher than 5.8, and extracting the aqueous solution with solvent to recover a final proportion of acetylacetone.

5. A process as claimed in claim 4 including the further step of recycling the final portion of acetylacetone to a subsequent solution of sodium salt of acetylacetone for recovery.

References Cited in the file of this patent

UNITED STATES PATENTS

| 2,158,071 | Hansley | May 16, 1939 |

FOREIGN PATENTS

| 995,499 | France | Aug. 22, 1951 |